United States Patent
Alken et al.

(10) Patent No.: US 11,273,477 B2
(45) Date of Patent: Mar. 15, 2022

(54) ROLL STAND

(71) Applicant: SMS group GmbH, Düsseldorf (DE)

(72) Inventors: Johannes Alken, Siegen (DE); Daniel Knie, Freudenberg (DE); Dennis Braach, Netphen (DE)

(73) Assignee: SMS group GmbH, Düsseldorf (DE)

( * ) Notice: Subject to any disclaimer, the term of this patent is extended or adjusted under 35 U.S.C. 154(b) by 180 days.

(21) Appl. No.: 16/648,814

(22) PCT Filed: Sep. 19, 2018

(86) PCT No.: PCT/EP2018/075385
§ 371 (c)(1),
(2) Date: Mar. 19, 2020

(87) PCT Pub. No.: WO2019/057790
PCT Pub. Date: Mar. 28, 2019

(65) Prior Publication Data
US 2020/0222957 A1    Jul. 16, 2020

(30) Foreign Application Priority Data

Sep. 19, 2017 (DE) .................... 10 2017 216 547.2

(51) Int. Cl.
*B21B 31/07* (2006.01)
*F16C 13/02* (2006.01)
*B21B 31/08* (2006.01)

(52) U.S. Cl.
CPC ............ *B21B 31/074* (2013.01); *F16C 13/02* (2013.01); *B21B 31/076* (2013.01); *B21B 31/08* (2013.01);
(Continued)

(58) Field of Classification Search
CPC ....... B21B 31/07; B21B 31/074; B21B 27/06; B21B 31/076; F16C 13/02; F16C 2322/12
See application file for complete search history.

(56) References Cited

U.S. PATENT DOCUMENTS 4,615,627 A * 10/1986 Schilling ................. B21B 31/07
384/551
4,714,359 A * 12/1987 Winter .................... B21B 31/07
384/558
(Continued)

FOREIGN PATENT DOCUMENTS

EP    2858767 B1    4/2015
EP    2858768 A1    4/2015
(Continued)

OTHER PUBLICATIONS

International Search Report with English translation and Written Opinion with Machine translation dated Dec. 14, 2018 in corresponding International Application No. PCT/EP2018/075385; 16 pages.
(Continued)

*Primary Examiner* — Gregory D Swiatocha
*Assistant Examiner* — Bobby Yeonjin Kim
(74) *Attorney, Agent, or Firm* — Maier & Maier, PLLC

(57) ABSTRACT

A roll stand for the rolling of rolling stock, especially metal products. The roll stand includes at least two chocks for mounting at least one roll, the roll being rotatably mounted in the chocks by its two cylindrical roll necks. A cylindrical neck bushing is arranged on the roll neck with radial play. A rotationally fixed annual axial bearing is axially offset from the neck bushing. The bearing arrangement for the roll necks in the chocks is formed as a plain bearing, preferably a hydrodynamic oil film bearing. When subjected to a load in a rolling process, the neck bushing moves and deforms not only in the radial direction, but also in the axial direction.

18 Claims, 3 Drawing Sheets

(52) U.S. Cl.
CPC ....... *B21B 2203/28* (2013.01); *F16C 2226/50* (2013.01); *F16C 2322/12* (2013.01)

(56) References Cited

U.S. PATENT DOCUMENTS

| | | | | |
|---|---|---|---|---|
| 7,082,800 | B1* | 8/2006 | Muller | B21B 31/08 |
| | | | | 72/237 |
| 9,180,501 | B1* | 11/2015 | Keller | B21B 13/00 |
| 2002/0165074 | A1* | 11/2002 | Kusters | F16C 39/02 |
| | | | | 492/7 |
| 2007/0012081 | A1* | 1/2007 | Shriner | B21B 31/074 |
| | | | | 72/237 |
| 2007/0107210 | A1* | 5/2007 | Keller | B21B 31/08 |
| | | | | 29/724 |
| 2012/0128279 | A1* | 5/2012 | Baker | F16C 25/06 |
| | | | | 384/91 |
| 2012/0134617 | A1* | 5/2012 | Keller | F16C 35/063 |
| | | | | 384/562 |
| 2013/0324384 | A1* | 12/2013 | Keller | B21B 31/074 |
| | | | | 492/1 |
| 2019/0101161 | A1* | 4/2019 | Knie | B21B 31/07 |

FOREIGN PATENT DOCUMENTS

| | | |
|---|---|---|
| WO | 2007/121806 A1 | 11/2007 |
| WO | 2010/069590 A1 | 6/2010 |

OTHER PUBLICATIONS

International Preliminary Report on Patentability dated Apr. 15, 2019 in corresponding International Application No. PCT/EP2018/075385; 35 pages.

\* cited by examiner

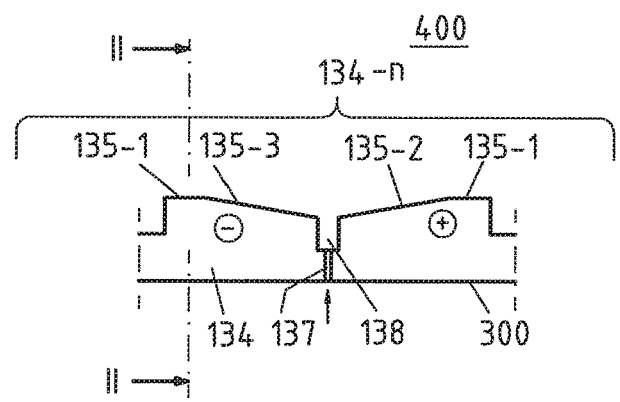
Figure 4
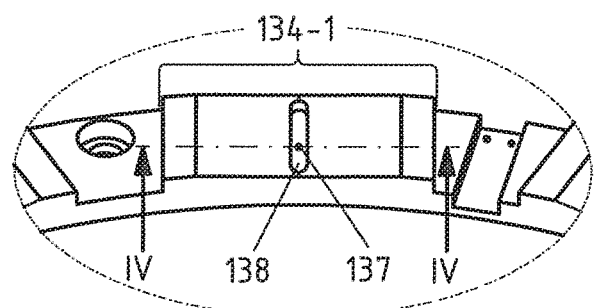
Figure 3
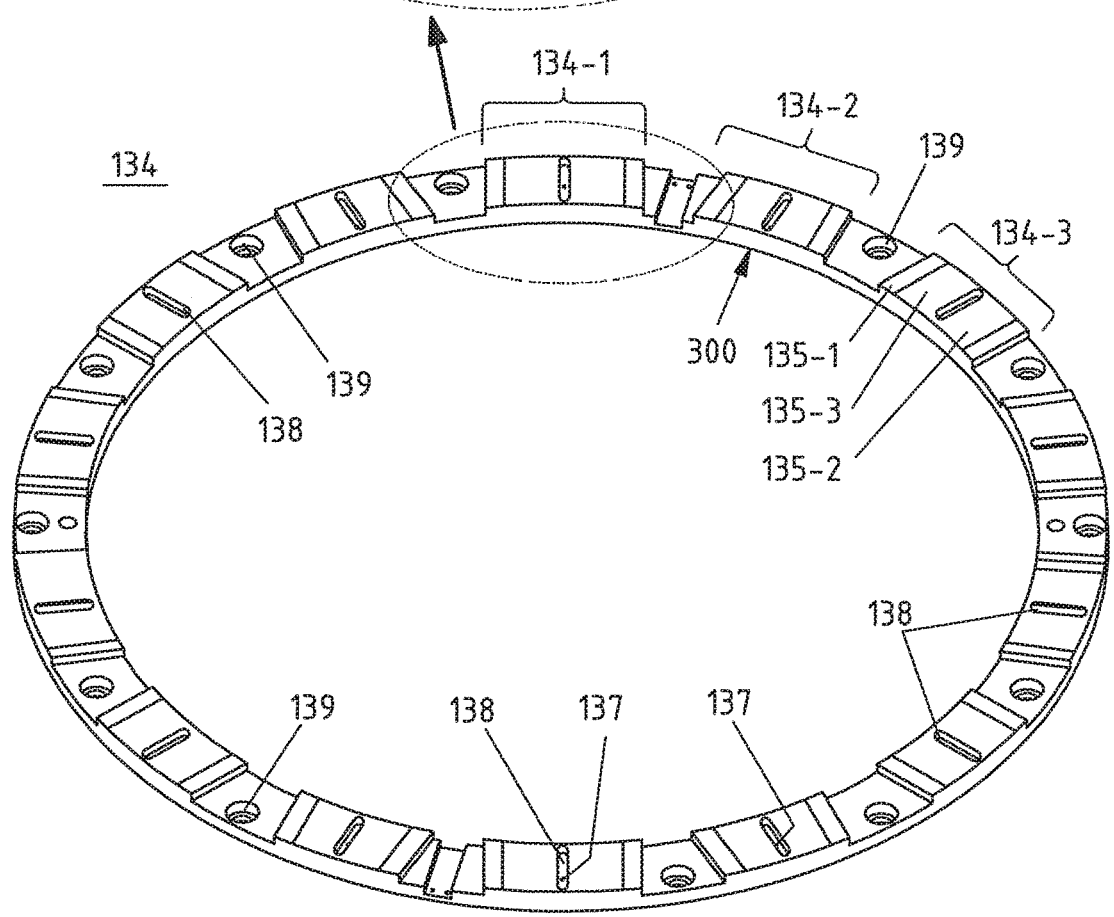

ROLL STAND

FIELD

The disclosure relates to a roll stand with at least one roll for the rolling of rolling stock. The roll has a roll barrel and typically two roll necks. Neck bushings are shoved onto the roll necks, by which the roll is rotatably mounted in chocks in a roll stand.

BACKGROUND

The rolls discussed in the context of the present patent application are typically backing rolls, such as are used in hot and cold rolling stands of the rolling and foundry industry. The neck bushings together with bearing bushings in the chocks typically form a radially acting plain bearing. Thanks to this plain bearing, the rolling force is transmitted from a stationary system (adjusting cylinder) to a rotating system (the roll).

There are two basic configurations for the roll necks in connection with the roll bushings:

On the one hand, there are conical roll necks with conical neck bushings. The neck bushing in these cases is clamped by a pressure shoulder ring on the cone of the roll neck. This assemblage is also rotationally secured by a feather key, and a relatively large fastening unit is required for the axial positioning, which must apply a large prestressing force. The drawback of this design is the large fastening unit, the need for large and long roll necks, the need for many additional fastening components, and the need for the presence of a pull-on device to generate the prestressing force with which the conical neck bushing must be pressed when pulling it onto the conical roll necks.

Cylindrical neck bushings, on the other hand, are typically shrunk-fit on a roll neck. Therefore, they are not axially movable, nor is a radial deformation possible, which is absolutely essential for boosting the hydrodynamic supporting force, on account of the shrink fitting. Moreover, the mounting and dismounting of the shrunk-fit neck bushings are time consuming.

One example of a non-shrunk fit cylindrical neck bushing is disclosed in the European patent EP 2 858 767 B1. According to this patent, the neck bushing is mounted on the roll neck with an oversize dimension, i.e., at least a partial radial play.

This radial play of the neck bushing is absolutely essential in order to realize a boosting of the hydrodynamic supporting force with the bearing.

In such hydrodynamic plain bearings, especially oil film bearings, however, the neck bushing moves and deforms under loading not only in the radial direction, but also in the axial direction. On the whole, the neck bushing in these hydrodynamic plain bearings should ideally "float" as freely as possible on the roll neck. However, this freedom of movement of the neck bushing on the roll neck cannot be arbitrary and unlimited, of course.

SUMMARY

Therefore, the problem which the invention proposes to solve is to modify a known roll stand for the rolling of rolling stock so that wear or damage to the components from axial stresses are effectively prevented by the neck bushing.

This problem is solved by the subject matter of patent claim 1. This is characterized in that the neck bushing is mounted in axially movable manner between a first abutment, formed by the axial bearing, and a second abutment along an axial path a on the cylindrical roll neck.

Because the fastening units for holding the neck bushing on the roll neck during the rolling operation can now be dispensed with, the roll stand and especially the chocks can be built shorter in width.

The proposed configuration of the roll stand gives the neck bushing a degree of freedom for its displacement or deformation in the axial direction. By providing this degree of freedom, provision is made for the natural need for displacement and deformation of the neck bushing during the operation of the hydrodynamic plain bearing. At the same time, by providing the axial degree of freedom or an axial play—unlike a fixed axial clamping of the neck bushing—one prevents wear or a defect due to mechanical overloading from occurring at the clamping points or at the axial end stops for the neck bushing. Neither does the proposed axial degree of freedom for the neck bushing stand in the way of a radial deformation of the neck bushing. Thanks to the use of the axial bearing as a one-sided abutment for the neck bushing, the many traditionally needed fastening points are advantageously now no longer required. This holds, for example, for a pressure shoulder ring with various accessories, which was traditionally needed in order to hold the neck bushing on the roll neck during the rolling operation. Also, the traditionally required pull-on devices for pulling the neck bushings onto the roll necks with a pretensioning are no longer needed, thanks to the desired radial play which is now present.

According to a first exemplary embodiment, the axial bearing is rotationally fixed in regard to the rotatably mounted roll. This is required in order for the axial bearing to effectively absorb axial forces exerted by the neck bushing. For this, the axial bearing must be braced somewhere in the axial direction, preferably against the chock according to the invention, to which it is preferably firmly connected.

The advantageous design of the axial bearing as a plain bearing according to the invention, preferably as an oil film bearing, affords the advantage that the lubricant supply of this axial bearing can come via the already present lubricant supply for the roll stand. The axial bearing advantageously consists of a ring-shaped base body and a bearing race preferably connected releasably to the base body. The base body and the bearing race may also be formed as a single piece. The lubricant supply of the axial plain bearing advantageously comes via a lubricant duct organized in the base body of the axial bearing and at least one through bore provided in the bearing race and in fluidic communication with the lubricant duct. By the through bore, the lubricant, such as oil, is pumped to the outside of the axial bearing into a ring-shaped gap between the bearing race and the neck bushing.

Advantageously, an annular lubricant collection space is formed between the base body and the bearing race in order to create a uniform pressure in the lubricant at the back side of the bearing race—distributed over the entire circumference, before the lubricant enters the mentioned gap.

According to another exemplary embodiment, the bearing race has a plurality of race segments distributed about its circumference, which protrude axially in the direction of the neck bushing—with respect to the base body. Each of the race segments has partial surfaces facing toward the neck bushing, which can be formed plane parallel to a radial plane and/or positively and/or negatively inclined relative to this radial plane. The plane parallel partial surfaces act as engaging faces or as an abutment for the neck bushing distant from the roll barrel. The inclined partial surfaces form, together with the end face of the neck bushing respectively turned toward them—depending on the direction of turning of the roll—a lubricant space tapering in the circumferential direction. The tapering of the lubricant space in the direction of turning of the roll advantageously produces a buildup of pressure in the lubricant, which becomes compressed in the tapering space during the rolling operation or the rotation of the roll. In this way, a pressurized lubricant film is created between the axial plain bearing and the end face of the neck bushing, thereby effectively preventing wear or damage to the bearing race during the rolling operation.

According to another exemplary embodiment, the partial surfaces of the race segments are arranged adjacent to each other in the circumferential direction of the bearing race such that each time a surface with positive inclination relative to the radial plane is facing toward a surface with negative inclination. Depending on the direction of turning of the roll, either the partial surface with positive inclination or the partial surface with negative inclination forms said lubricant space tapering in the circumferential direction in order to build up pressure in the lubricant.

BRIEF DESCRIPTION OF THE DRAWINGS

Further advantageous embodiments of the roll stand according to the invention are the subject matter of the dependent claims.

Four figures are appended to the specification, showing
FIG. 1 a roll stand;
FIG. 3 a bearing race designed according to the invention;
and
FIG. 4 a section through a race segment of the bearing race in the circumferential direction.

DETAILED DESCRIPTION

The invention shall now be described in detail with reference to the mentioned figures in the form of exemplary embodiments. In all the figures, the same technical elements are given the same reference numbers.

Figure 1:
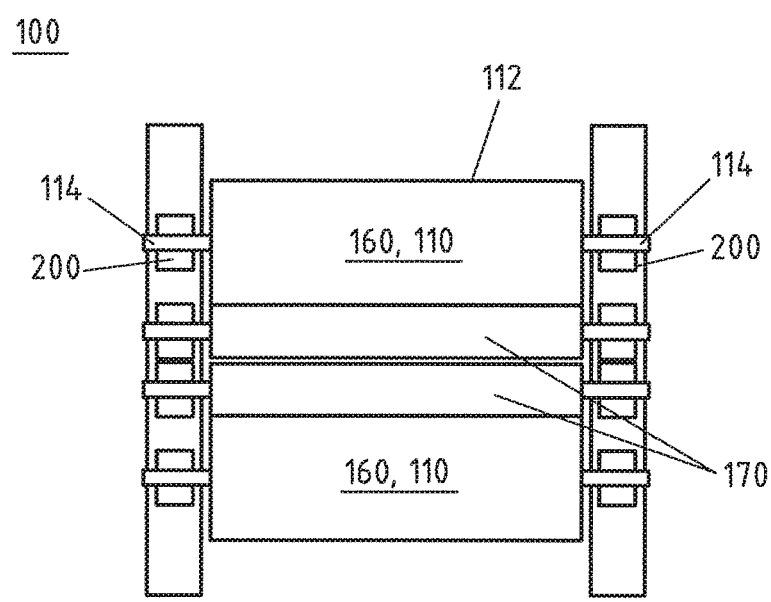

FIG. 1 shows a roll stand 100, for example a quarto roll stand with two working rolls 170 for the rolling of rolling stock, especially metal products, and two backing rolls 160 for supporting the working rolls. Each of the rolls has a respective roll barrel 112 and two roll necks 114 by which the respective roll is rotatably mounted in chocks 200 in the roll stand 100.

The present invention concerns in particular the mounting of the rolls or the roll necks in the chocks. Not all of the rolls or the roll necks in a roll stand need to be mounted according to the present invention. The mounting according to the invention will be used preferably for the mounting of backing rolls; however, the invention is not limited to backing rolls.

Figure 2:
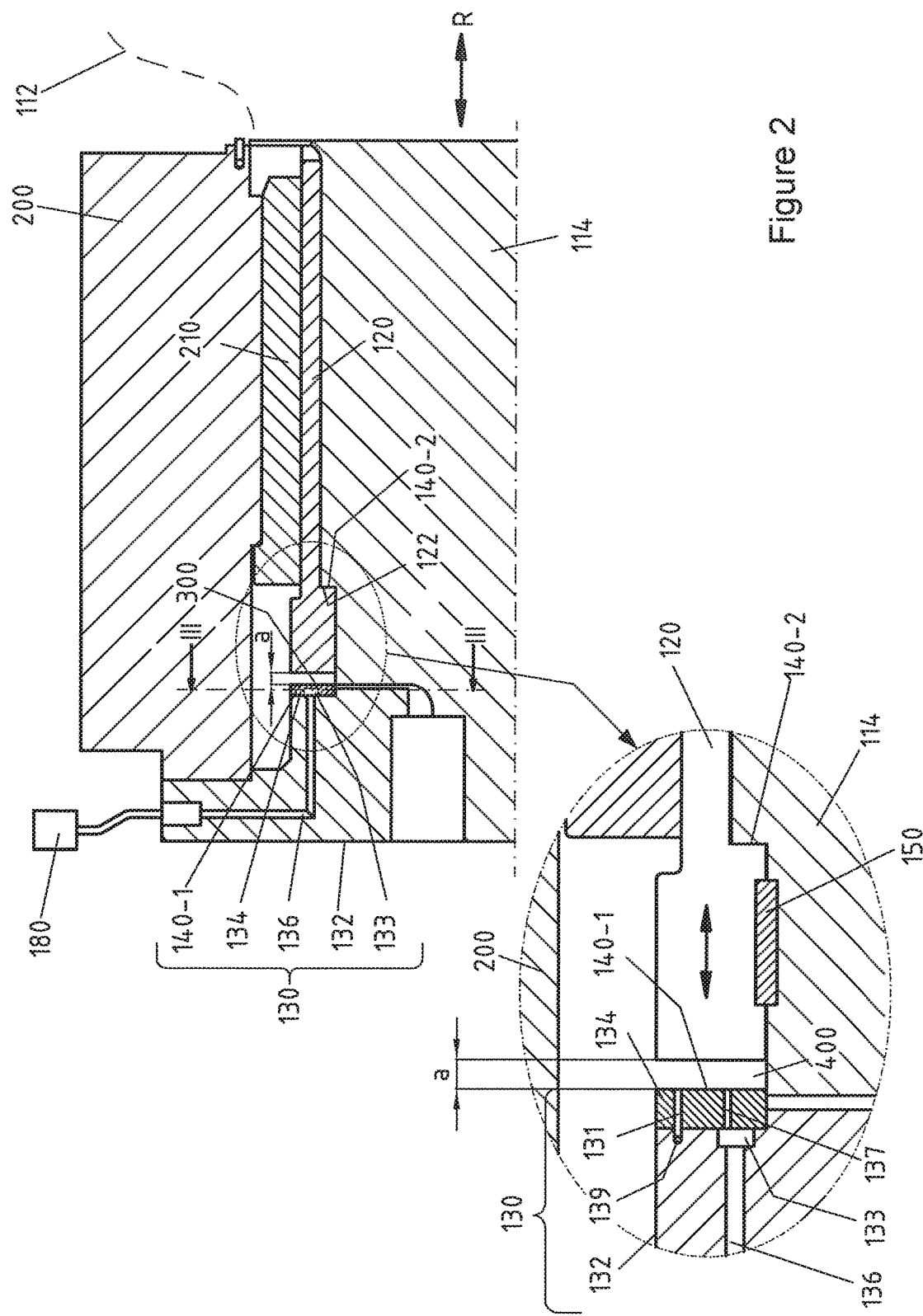
FIG. 2 a longitudinal section through a chock with roll mounted therein or with roll neck mounted therein.

FIG. 2 shows the mounting according to the invention as an example. One will notice a chock 200, also called a bearing housing, with a bearing bushing 210. The bearing bushing spans a cylindrical space for receiving a roll neck 114 of a roll 110. For the present invention, the roll neck 114 is cylindrical. On the roll neck there is a cylindrical neck bushing 120 having radial play. An axial bearing 130 is provided on the side of the neck bushing distant from the roll barrel, offset in the axial direction R. This axial bearing functions according to the invention as a first abutment 140-1 for the neck bushing 120, distant from the roll barrel. Furthermore, the axial freedom of movement of the neck bushing 120 is limited by a second abutment 140-2 near the roll barrel, in addition to the first abutment 140-1. Between these two end stops, the neck bushing is mounted with free axial displacement ability along an axial path a. The path a, that is, the play allowed to the neck bushing 120 in the axial direction R, is in the range of 1 mm to 20 mm, for example. Unlike the bearing bushing 210 which is firmly connected to the chock 200, the neck bushing 120 because of its radial and axial play is free to move in the radial and axial direction. In the circumferential direction, however, the roll 110 is typically secured by a feather key 150.

The axial bearing 130 according to the invention is designed as a plain bearing, especially as an oil film bearing. It consists of an annular base body 132 preferably firmly joined to the chock 200, but preferably in releasable manner, and a bearing race 134, which is firmly joined to the base body, but preferably in releasable manner. The bearing race is arranged coaxially to the base body on the side of the base body 132 facing toward the neck bushing 120 and is attached to the base body, for example with screws 131. The releasable connection between the bearing race 134 and the base body 132 is advantageous for easy replacement of the bearing race in event of wear and for easy fabrication of the later described lubricant collection space 133. Alternatively or basically, however, the bearing race 134 and the base body 132 may also be formed as a single piece.

In FIG. 2, furthermore, it can be seen that at least one lubricant duct 136 is formed in the base body 132, being connected to the already present lubricant supply 180 of the roll stand. The lubricant duct 136 enables a supply of lubricant, such as oil, from the lubricant supply 180 via through bores 137 in the bearing race 134 into a ring-shaped gap 400 between the bearing race 134 and the neck bushing 120. Preferably, a ring-shaped lubricant collection space 133 is formed between the base body 132 and the bearing race 134, which advantageously makes possible a homogenization of the pressure buildup in the lubricant in the circumferential direction.

The second abutment 140-2, near the roll barrel, for limiting the axial freedom of movement of the neck bushing 120, is formed for example by a shoulder in the surface of the roll neck 114, as shown in FIG. 2. A complementary abutment 122 is then formed on the inside of the neck bushing 120 for butting against the shoulder 140-2 in the surface of the roll neck 114.

FIG. 3 shows the bearing race 134 according to the invention in enlarged perspective detailed representation. It will be noticed that the bearing race 134 has a plurality of race segments 134-1, 134-2, etc., distributed about its circumference. These race segments are elevated with respect to the flat back side 300 of the bearing race 134. In other words: in the installed condition, the back side 300 of the bearing race faces toward the base body 132 and the race segments are formed respectively on the side of the bearing race 134 facing away from the base body 132 and accordingly are elevated from the base body in the direction of the neck bushing. The back side 300 of the bearing race 134 facing toward the base body 132 then forms a radial plane 300. The race segments 134-$n$ form respective elevations with respect to this back side or radial plane.

In the circumferential direction, said radial segments 134-$n$ preferably alternate with n=1 to N and holes 139. The holes 139 serve for screwing the bearing race 134 to the base body 132.

Said race segments respectively have partial surfaces 135-1, 135-2 and 135-3, having different inclinations with respect to said radial plane 300.

FIG. 4 shows a longitudinal section through one such race segment 134-n in a detail view. The horizontal line shown in the lower portion of FIG. 4 represents the surface or the back side of the bearing race 134 facing toward the base body 132. This line also represents the radial reference plane 300. On its end face away from the base body 132, the race segment 134 exhibits a structure which is formed substantially by three different partial surfaces 135-1, 135-2 and 135-3. The partial surfaces 135-1 run substantially parallel to the radial plane 300. They may serve as an engaging or stowage face for the cylindrical bushing outside of rolling operation. The two partial surfaces 135-2 and 135-3 differ in their inclination relative to the radial reference plane 300. While the partial surface 135-2 has a positive inclination relative to the radial reference plane 300, the inclination or gradient of the partial surface 135-3 is negative relative to the radial reference plane 300. The gradient for the two partial surfaces may be 1:100, for example. Preferably, the two partial surfaces 135-2 and 135-3 are formed adjacent to and facing each other by their different inclinations, as shown in FIG. 4.

Between the two partial surfaces with different inclination there is preferably formed a lubricant pocket 138, having at its bottom the through bore 137, which communicates fluidically with the lubricant duct 136 in the base body 132 of the axial bearing 130. During rolling operation, lubricant enters the through bore 137 in the direction of the arrow, arriving at first in the lubricant pocket 138 and going from here into the annular gap 400 between the bearing race and the neck bushing 120.

Refer to the description given above with regard to the function of the inclined partial surfaces 135-2 and 135-3 for building up pressure.

The invention claimed is:

1. A roll stand for the rolling of rolling stock, comprising:
    at least two chocks;
    at least one roll having a roll barrel and two roll necks, at least one of which is cylindrical in shape, the roll being rotatably mounted with their roll necks in the chocks;
    a cylindrical neck bushing arranged coaxially on the cylindrical roll neck with radial play; wherein the chocks have respective bearing bushings to receive the roll necks of the roll with their respective neck bushings and an annual axial plain bearing arranged axially offset from the neck bushing;
    wherein the neck bushing is mounted in an axially movable manner between a first abutment in the form of the annual axial plain bearing and a second abutment along an axial path a on the cylindrical roll neck.

2. The roll stand according to claim 1, wherein the annual axial plain bearing is rotationally fixed in regard to the rotatably mounted roll.

3. The roll stand according to claim 2, wherein the axial plain bearing has an annular base body firmly joined to the chock and a bearing race, which is arranged coaxially to the base body on the side of the base body facing toward the neck bushing and is firmly joined to the base body.

4. The roll stand according to claim 3, wherein the base body and the bearing race are formed as a single piece.

5. The roll stand according to claim 3, wherein the base body comprises at least one lubricant duct and the bearing race comprises at least one through bore—in fluidic communication with the lubricant duct for the supplying of lubricant outside of the annual axial plain bearing to an annular gap between the bearing race and the neck bushing.

6. The roll stand according to claim 5, wherein an annular lubricant collection space is formed between the base body and the bearing race.

7. The roll stand according to claim 3, wherein the bearing race has a plurality of race segments distributed about its circumference, which protrude in the direction of the neck bushing—with respect to the back side of the bearing race and a radial plane between the base body and the bearing race;
    and the partial surfaces of each of the race segments facing toward the neck bushing are formed plane parallel to the radial plane and/or positively and/or negatively inclined in relation to the radial plane.

8. The roll stand according to claim 7, wherein partial surfaces of the race segments are arranged adjacent to each other in the circumferential direction of the bearing race such that each time a surface with positive inclination relative to the radial plane is facing toward a surface with negative inclination.

9. The roll stand according to claim 5, wherein the through bore is arranged in the bearing race between a partial surface with positive inclination and a partial surface with negatively inclined surface.

10. The roll stand according to claim 1, wherein the axial path a is 1 mm≤a≤20 mm.

11. The roll stand according to claim 1, further comprising: a feather key arranged between the roll neck and the neck bushing in order to prevent a rotary movement of the neck bushing relative to the roll neck.

12. The roll stand according to claim 1, wherein the second abutment is formed by a shoulder in the surface of the roll neck.

13. The roll stand according to claim 12, wherein an abutment is formed on the inside of the neck bushing to butt against the shoulder in the surface of the roll neck.

14. The roll stand according to claim 1, wherein the neck bushing is situated in the axial direction closer to the roll barrel than is the annual axial plain bearing.

15. The roll stand according to claim 1, wherein the at least one roll is a backing roll.

16. The roll stand according to claim 1, wherein the roll stand comprises two backing rolls and two working rolls rotatably mounted between the backing rolls for the rolling of the rolling stock.

17. The roll stand according to claim 16, wherein intermediate rolls are rotatably mounted between the backing and the working rolls.

18. The roll stand according to claim 5, wherein the lubricant duct of the base body is connected to the lubricant supply of the roll stand.

* * * * *